J. VODICKA.
CURTAIN FASTENER.
APPLICATION FILED JULY 12, 1919.
1,415,129.
Patented May 9, 1922.
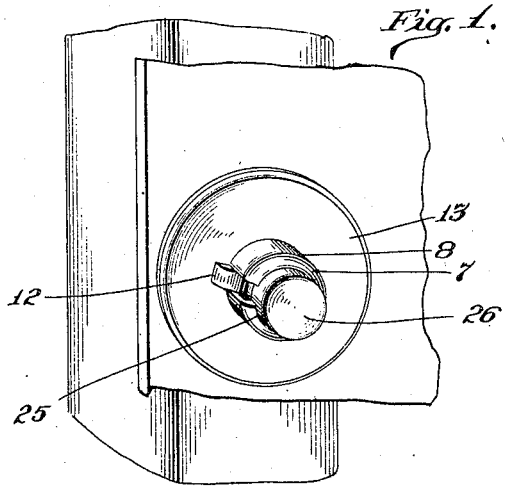
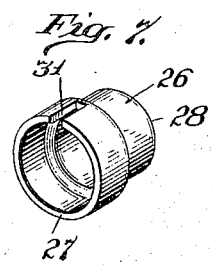
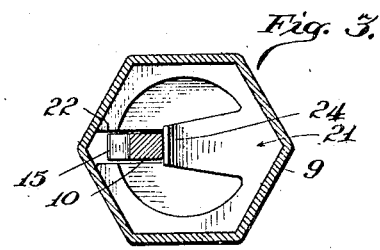
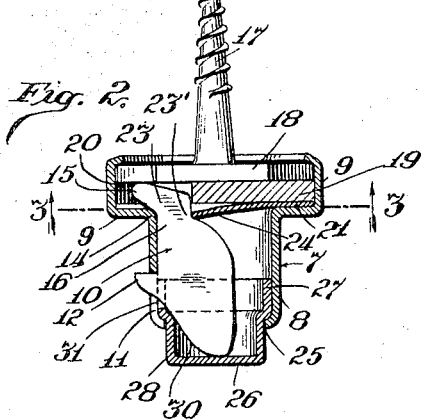
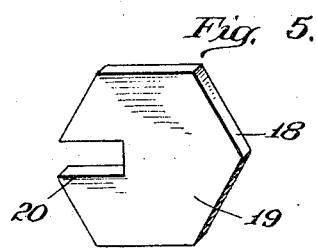
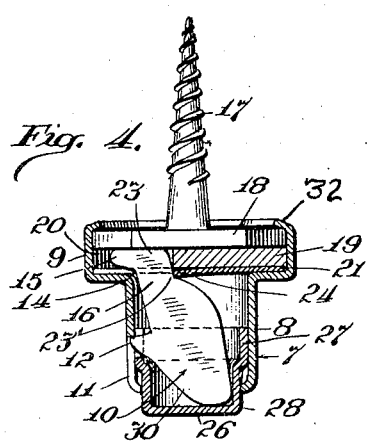
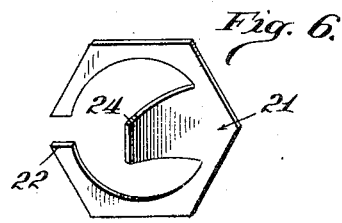
John Vodicka Inventor
Attorneys.

UNITED STATES PATENT OFFICE.

JOHN VODICKA, OF CHICAGO, ILLINOIS, ASSIGNOR TO CINCH FASTENER CORPORATION, OF CHICAGO, ILLINOIS, A CORPORATION OF ILLINOIS.

CURTAIN FASTENER.

1,415,129.   Specification of Letters Patent.   Patented May 9, 1922.

Application filed July 12, 1919. Serial No. 310,403.

*To all whom it may concern:*

Be it known that I, JOHN VODICKA, a citizen of the United States, residing in Chicago, State of Illinois, and county of Cook, have invented certain new and useful Improvements in Curtain Fasteners, of which the following is a specification.

My invention relates to curtain fasteners more especially designed for use in connection with automobile curtains though obviously from the following description it is applicable to a variety of other uses where a ring such as a grommet is to be removably held upon a stud. Prior to the present invention in articles of this character the stud has been made hollow and provided with a movable catch the nose or end of which projects laterally through the wall of the hollow stud, when in normal position and is withdrawn by a lateral movement inside the hollow stud to release the grommet and thereby the curtain to which the grommet is attached. In such prior art devices the stud is slotted at its end and the latch projects through the slot to be engaged by the finger of the operator to move the stud laterally. Such a construction is objectionable in appearance and furthermore, if it is to be kept to practicable dimensions the end to be engaged by the finger must be of such a shape and size as to make the manipulation thereof difficult and uncomfortable. In my improved construction, however, the latch is withdrawn by a direct axial pressure of the finger similar to the common "press-the button" movement thus avoiding the difficulties referred to above.

In the drawings accompanying and forming part of this application Fig. 1 is a perspective showing a fastener of my improved construction on a suitable support and engaging a grommet of a curtain to hold the latter in place; Fig. 2 is an axial section thereof on an enlarged scale; Fig. 3 a section on the plane of the line 3—3 of Fig. 2 looking in the direction of the arrows; Fig. 4 a view similar to Fig. 2 but showing the parts in a different position and Figs. 5, 6 and 7 perspectives of details of the device.

My improved fastener comprises a housing 7 which may be struck up out of sheet metal and comprises a cylindrical portion 8 and a base portion 9 the latter being of enlarged diameter. The housing contains the latch 10 and the side wall thereof is slotted at 11 to permit the nose 12 of the latch to move therethrough for the purpose of engaging the ring or grommet and holding the same upon the stud. In Fig. 1 the grommet is shown at 13. The latch 10 is loosely held within the housing and fulcrums about the internal angle 14 between the cylindrical wall 8 and the flat top 9 of the base portion of the housing, the latch being formed for this purpose with a toe piece 15 which forms an obtuse angle with the body 16 of the latch to permit a limited angular movement with reference to the rounded corner of the housing. The housing is secured to the support by means of a screw 17 the head 18 of which, in the particular form shown, is hexagonal to conform to the base of the housing. Above the head 18 of the screw is a washer or filler plate 19 of similar general outline but slotted at 20 to afford a space within which the toe 15 of the latch swings. Between the filler plate 19 and the top 9 of the base is inserted a spring plate 21 also of hexagonal form and cut away at 22 in registry with the slot 20 of the filler plate to permit the foot 23 of the latch to extend therethrough. Spring plate 21 has a spring tongue 24 struck up therefrom in a position to engage the reentrant angle 23' at the back of the latch so as to yieldingly hold the latter with its nose 12 projected. The upper or outer end of the housing is open as at 25 except for a slight inwardly turned lip or flange and a hollow plunger 26 slides within the body of the housing, the open or inner end 27 of the plunger being of a diameter to fit loosely and slide within the housing and the outer end 28 of the plunger being somewhat reduced in diameter to slide through the opening 25 in the end of the stud. The nose of the latch is tapered or inclined at 30 with respect to the axis of the stud and the hollow plunger is cut away at 31 to permit the nose to extend through the side of said plunger and through the slot in the wall of the stud. The slot in the side wall is of such depth that the end of said slot engages the cammed or inclined nose of the catch and thereby the plunger is normally maintained in the outward position shown in Fig. 2. To withdraw the latch to permit the removal of the grommet from the stud the plunger is pressed inward, the end of the slot driving downward upon the nose of the catch and forcing it inward within the casing thereby releasing the grommet.

In assembling this construction the hollow plunger is first dropped into position and then the latch inserted followed by the spring plate 21, the filler plate 19 and the screw head 18, it being understood that the housing as formed is without the inwardly turned flange 32, the said walls of the base, however, being of sufficient depth to provide for this flange 32 which is turned over after the parts are assembled, to hold the screw cap in position.

I claim:

1. In a device of the class described, a hollow stud having an open end and a slot in the side wall thereof, a pivoted catch within the stud the nose of which normally projects through the slot in the wall of the stud and a hollow plunger movable longitudinally of the hollow stud, slotted to permit the passage of the nose of the latch and engaging the latter.

2. In a device of the class described, a cylindrical housing having a hollow base of larger diameter, there being a shoulder formed between the main body of the housing and the hollow base of enlarged diameter, said housing being provided with a longitudinally extending slot, a latch fulcrumed on said shoulder and having a nose projecting through the slot, a hollow plunger sliding longitudinally of the housing and projecting beyond the end of the same, and engaging the nose of the latch to swing the latter about its pivot, a spring within the hollow base and engaging the latch and normally maintaining the latter in a position with its nose projecting through the slot in the housing and means for securing the hollow base to a support.

3. In a device of the class described, a housing having a cylindrical slotted wall a latch having a nose and a toe portion therein, the toe portion forming a re-entrant angle and the latter engaging a portion of the housing which constitutes a fulcrum for the latch, a hollow plunger sliding longitudinally of the housing and engaging the nose of the latch to retract the latter and a spring normally holding the latch in its projected position.

4. In a device of the class described, a cylindrical housing having a hollow base of large diameter, there being a shoulder formed between the main body of the housing and the hollow base of enlarged diameter, said housing being provided with a longitudinally extending slot, a latch fulcrumed on said shoulder and having a nose projecting through the slot, a hollow plunger sliding longitudinally of the housing and projecting beyond the end of the same, and engaging the nose of the latch to swing the latter about its pivot, a spring disc 21 having a spring tongue 24, the disc being inserted in the base of enlarged diameter and the tongue engaging the latch and normally projecting the same, and means for closing the end of the base.

5. In a device of the class described, a cylindrical housing having a hollow base of large diameter, there being a shoulder formed between the main body of the housing and the hollow base of enlarged diameter, said housing being provided with a longitudinally extending slot, a latch fulcrumed on said shoulder and having a nose projecting through the slot, a hollow plunger sliding longitudinally of the housing and projecting beyond the end of the same, and engaging the nose of the latch to swing the latter about its pivot, a plate within the base and engaging the shoulder and having a spring tongue 24 engaging the latch and normally holding the latter in projected position, a washer 19 slotted at 20 to receive the toe of the latch, and securing means having a head closing the opening of the base.

JOHN VODICKA.